US010705865B2

(12) United States Patent
Simoncelli

(10) Patent No.: US 10,705,865 B2
(45) Date of Patent: Jul. 7, 2020

(54) DISK RESIZE OF A VIRTUAL MACHINE

(71) Applicant: Red Hat, Inc., Raleigh, NC (US)

(72) Inventor: Federico Simoncelli, Fano (IT)

(73) Assignee: Red Hat, Inc., Raleigh, NC (US)

( * ) Notice: Subject to any disclaimer, the term of this patent is extended or adjusted under 35 U.S.C. 154(b) by 75 days.

(21) Appl. No.: 14/189,710

(22) Filed: Feb. 25, 2014

(65) Prior Publication Data

US 2015/0242224 A1  Aug. 27, 2015

(51) Int. Cl.
*G06F 9/455* (2018.01)
*G06F 9/445* (2018.01)

(52) U.S. Cl.
CPC ...... *G06F 9/45533* (2013.01); *G06F 9/44505* (2013.01)

(58) Field of Classification Search
CPC .................................................. G06F 9/45533
USPC ............................................................ 718/1
See application file for complete search history.

(56) References Cited

U.S. PATENT DOCUMENTS

| | | | | |
|---|---|---|---|---|
| 6,804,763 | B1* | 10/2004 | Stockdale | ............ G07F 17/3241 463/24 |
| 7,631,313 | B2* | 12/2009 | Mayhew | ............. G06F 13/4252 709/231 |
| 2001/0056461 | A1* | 12/2001 | Kampe | ............... H04L 12/2602 709/201 |
| 2007/0038667 | A1* | 2/2007 | Abe | ........................ G06F 3/1207 |
| 2007/0233698 | A1* | 10/2007 | Sundar | ...................... G06F 8/60 |
| 2011/0047328 | A1* | 2/2011 | Huang | .................. G06F 3/0607 711/112 |
| 2011/0078405 | A1* | 3/2011 | Asano | ................... G06F 3/0607 711/170 |
| 2012/0159232 | A1* | 6/2012 | Shimada | ............. G06F 11/1662 714/3 |
| 2013/0212593 | A1* | 8/2013 | Baset | ........................ G06F 9/50 718/104 |
| 2014/0109086 | A1* | 4/2014 | Mizrahi | ............. G06F 9/45558 718/1 |
| 2014/0280061 | A1* | 9/2014 | Elkhou | .................. G06Q 50/18 707/722 |
| 2015/0067283 | A1* | 3/2015 | Basu | ....................... G06F 3/061 711/162 |
| 2015/0295994 | A1* | 10/2015 | Siegman | .......... G06F 17/30076 709/203 |

\* cited by examiner

*Primary Examiner* — Chat C Do
*Assistant Examiner* — Bradford F Wheaton
(74) *Attorney, Agent, or Firm* — Lowenstein Sandler LLP

(57) ABSTRACT

An engine in a virtualization system may determine that a disk size of a disk represented by a virtual machine disk image is to be changed. In response, the engine determines whether a host is using the virtual machine disk image to run a virtual machine and also determines a file format of the virtual machine disk image. Based on the determination, the engine sends a request to change the disk size to a requested size to the host running the virtual machine or to a storage pool manager.

15 Claims, 4 Drawing Sheets

DISK RESIZE OF A VIRTUAL MACHINE

TECHNICAL FIELD

Embodiments of the present invention relate to changing the disk size of a disk represented by a virtual machine disk image.

DESCRIPTION OF THE RELATED ART

If the disk represented by a virtual machine disk image is too small to adequately perform the desired functions, a new virtual machine disk image representing a larger disk may be generated to perform the functions. Generation of the new virtual machine disk image may include a first step of provisioning the new virtual machine disk image and a second step of migrating the data from the old virtual machine disk image to the new virtual machine disk image.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein are systems and methods for changing the disk size of a disk represented by a virtual machine disk image. An engine of a virtualization system may coordinate with a number of different components to change the disk size of the disk represented by the virtual machine disk image and ensure that each of the components is in synch with respect to the new disk size. The engine may be configured to resize a disk represented by a virtual machine disk image that is running or not running. The engine may be configured to resize a disk represented by a virtual machine disk image in a raw file format or a specific file format, such as a qcow file format.

Thus, unlike other systems in which, if the disk represented by a virtual machine disk image is too small to adequately perform the desired functions, a new virtual machine disk image representing a larger disk may be generated to perform the functions, the disk represented by the virtual machine disk image can be resized without having to provision a new virtual machine disk image or migrate data to such a new virtual machine disk image.

Figure 1:
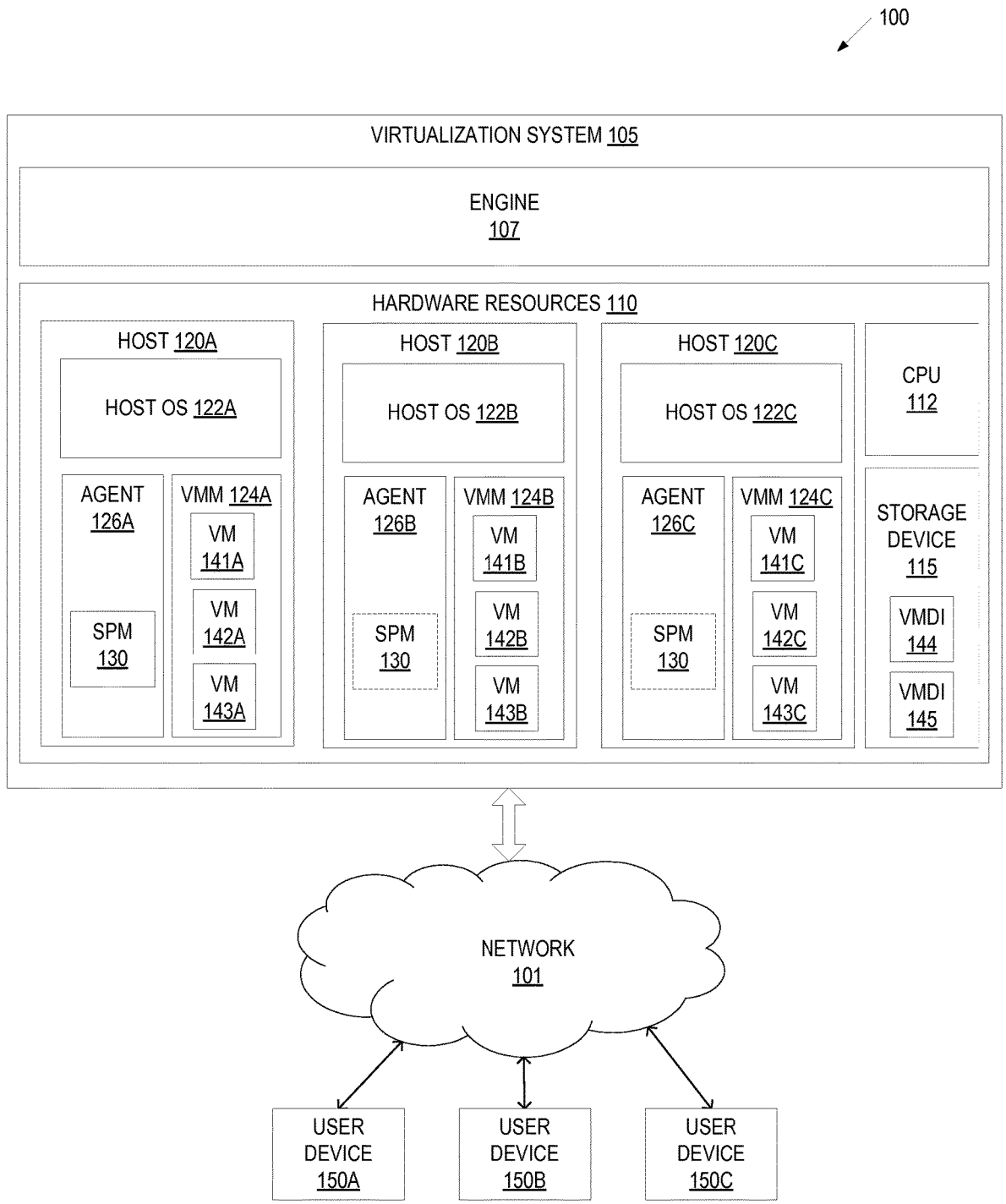
FIG. 1 is a block diagram of an example network architecture in which implementations of the present disclosure can operate.

FIG. 1 is a block diagram of an embodiment of a network architecture 100. The network architecture 100 includes a virtualization system 105 coupled to and accessible over a network 101 by a number of user devices 150A-150C. The virtualization system 105 includes a variety of hardware resources 110 which may include, for example, desktop computers, laptop computers, rackmount servers, routers, switches, tablet computers, mobile phones, or any other type of computing device. The hardware resources 110 may include one or more processing devices, memory, and/or additional devices such as a graphics card, hardware RAID controller, network controller, hard disk drive, universal serial bus (USB) device, internal input/output (I/O) device, keyboard, mouse, speaker, etc. The hardware resources 110 may be used to execute software, including one or more operating systems, virtual machines, or other applications. The virtualization system also includes an engine 107 (which executes on a portion of the hardware resources 110 or a separate device) that manages the hardware resources 110 and the processes running on the hardware resources 110.

The hardware resources 110 include a number of hosts 120A-120C (or host machines) each including a portion of the hardware resources 110. The hosts 120A-120C may each include one or more processing devices and one or more storage devices. The hardware resources 110 may further include one or more additional processing devices 112 and one or more additional storage devices 115.

Each of the hosts 120A-120C includes a kernel space and a user space defined by the hardware resources of the host 120A-120C. A host operating system (OS) 122A-122C is executed in the kernel space of the host 120A-120C. The host OS 122A-122C allows a host 120A-120C to make its hardware resources available to virtual machines 141A-143C which may be executed in the user space.

Each of the hosts 120A-120C may execute a virtual machine monitor (VMM) 124A-124C (or a hypervisor). The VMM 124A-124C executes on a host 120A-120C to manage virtual machines 141A-143C. In particular, the VMM 124A-124C can instantiate or dismiss virtual machines 141A-143C, pause or resume virtual machines 141A-143C, or configure virtual machines 141A-143C for various versions or operating systems. The VMM 124A-124C may include a virtualization API and a multi-platform emulator. Each virtual machine 141A-143C may execute a guest operating system that can be accessed by a user device 150A-150C over the network 101. Each virtual machine 141A-143C may further run guest applications using the guest operating system.

The VMM 124A-124C may instantiate virtual machines 141A-143C using virtual machine disk images stored in the hardware resources 110 of the virtualization system 105 such as storage devices of the hosts 120A-120C or other storage devices 115. The hardware resources 110 may store additional virtual machine disk images 144-145 corresponding to virtual machines that are not running.

A virtual machine disk image may be a mapped disk image file. As used herein, "file" includes device files such as block devices and character devices and other elements stored in a file system. A mapped disk image file may include a mapping portion (which may include a hierarchy of tables) that indicates where (in a data portion of the mapped disk image file) data for particular address of the represented disk may be found. For example, the virtual machine disk image may be qcow (QEMU [quick emulator] Copy On Write) file. A qcow file may be stored in a qcow or a qcow2 file format and may have a "qcow" or a "qcow2" file extension. A qcow file includes a header, a look-up portion, and a data portion. The header includes a size parameter that represents the size, in bytes, of the disk represented by the virtual machine disk image. The header includes other metadata regarding the file. The data portion includes the contents of the represented disk stored in clusters. The look-up portion includes a hierarchy of tables that indicate where (in the data portion of the file) data for particular address of the disk may be found.

A virtual machine disk image may be an unmapped disk image file. An unmapped image file may not include a mapping portion. An unmapped image file may include a sector-by-sector binary copy of the disk represented by the virtual machine disk image. For example, the virtual machine disk image may be a raw file. A raw file may be stored in an img file format and may have an "img" or an "ima" file extension. A raw file may include a sector-by-sector binary copy of a disk represented by the virtual machine disk image. In one embodiment, a raw file includes no additional data besides the sector-by-sector binary copy.

Each of the hosts 120A-120C includes an agent 126A-126C. The agent 126A-126C may facilitate inter-host communication and perform various monitoring and administrative tasks. The agent 126A-126C may also include functionality for acting as a storage pool manager (SPM) 130. However, in one embodiment, only one of the hosts 120A is active as the SPM 130 at any one time. The host 120A may be designated an active SPM 130 by the engine 107. The SPM 130 coordinates all metadata changes in the virtualization system 105, such as creating and deleting disk images, creating and merging snapshots, copying images between storage domains, creating templates and storage allocation for block devices of the hardware resources 110 such as hard drives or other storage devices.

A storage domain is a collection of data structures that have a common storage interface. A storage domain may contain complete images of templates and virtual machines (including snapshots). A storage domain may comprise one or more block devices, one or more storage devices, one or more file systems, one or more volumes, and/or portions thereof.

When the engine 107 determines that disk size of a disk represented by a virtual machine disk image is to be changed, the engine 107 performs resizing based on whether the virtual machine disk image is in use (e.g., the corresponding virtual machine is running) and based on the file type of the virtual machine disk image.

If the virtual machine disk image is not in use and the virtual machine disk image is an unmapped disk image file, the engine 107 sends a request to the SPM 130 to change the disk size to a requested size. The request to change the disk size to the requested size may be a request to the SPM 130 to change the file size of the virtual machine disk image. The SPM 130 may increase the file size by appending zeros to the end of the virtual machine disk image. The SPM 130 may decrease the file size by removing the end of the virtual machine disk image. To prevent data loss in response to such a request, the SPM 130 may, in one embodiment, determine if data is present at the end of the disk image and, if data is present, return an error rather than comply with the request. In another embodiment, the SPM 130 may return an error in response to any request to decrease the disk size or file size of the virtual machine disk image.

In one embodiment, the SPM 130 may return an acknowledgment that the disk size of the virtual machine disk image has been changed. In another embodiment, the engine 107 may, after sending the request, send a size query to the SPM 130 (or another device) to determine if the virtual machine disk image has been resized. In response to the size query, the SPM 130 (or another device) may send an answer to the engine 107 indicating the disk size of the virtual machine disk image.

The SPM 130 may be limited in the disk sizes it can resize a virtual machine to be. For example, the disk size of a raw image file may be a multiple of the sector size (typically 128, 512, or 1024 bytes). Thus, if the sector size is 512 bytes, in response to a request to change the disk size from 5120 bytes to a requested size of 10000 bytes, the SPM 130 may change the disk size to an actual size of 10240 bytes (e.g., the sector size multiplied by the ceiling of the requested size divided by the sector size). The SPM 130 may send an acknowledgement of the request to change the disk size that includes the actual size.

If the virtual machine disk image is not in use and the virtual machine disk image is a mapped disk image file, the engine 107 sends a request to the SPM 130 to change the disk size to a requested size. The SPM 130 may increase the disk size by increasing a size parameter in a header of the virtual machine disk image. The SPM 130 may decrease the disk size by decreasing the size parameter in the header of the virtual machine disk image. To decrease the disk size, the SPM 130 may also change the mapping portion of the virtual machine disk image to deallocate mappings to the terminal portion of the disk. The SPM 130 may remap data mapped to the terminal portion of the disk. To prevent data loss in response to such a request, the SPM 130 may, in one embodiment, determine if the file size of the virtual machine disk image (or the data portion thereof) is greater than the requested size, if so, return an error rather than comply with the request. In another embodiment, the SPM 130 may return an error in response to any request to decrease the disk size of the virtual machine disk image.

In one embodiment, the SPM 130 may return an acknowledgment that the disk size of the virtual machine disk image has been changed. In another embodiment, the engine 107 may, after sending the request, send a size query to the SPM 130 (or another device) to determine if the virtual machine disk image has been resized. In response to the size query, the SPM 130 (or another device) may send a response to the engine 107 indicating the disk size of the virtual machine disk image. The acknowledgment or the query response may include an actual size that is different (e.g., larger) than the requested size as discussed above.

If the virtual machine disk image is in use (e.g. the virtual machine is running) and the virtual machine disk image is an unmapped disk image file, the engine 107 sends a request to the SPM 130 to change the disk size to a requested size. The SPM 130 may respond to the request in the same manner as above in the not-running case for the unmapped disk image file. However, if the virtual machine is running, the engine 107 performs the additional operation of requesting that the host of the virtual machine notify the running virtual machine that the disk size has been changed. In particular, in response to an acknowledgement or query response indicating the actual size of the disk, the engine 107 sends a request to the host of virtual machine requesting that the host notify the virtual machine of the actual size of the disk.

If the virtual machine disk image is use (e.g., the virtual machine is running) and the virtual machine disk image is a mapped disk image file, the engine 107 sends a request to the host of the virtual machine (which may not be the SPM 130) requesting that the host instruct the virtual machine to change a size parameter in a header of the virtual machine disk image.

In one embodiment, the host may return an acknowledgment that the disk size of the virtual machine disk image has been changed. In another embodiment, the engine 107 may, after sending the request, send a size query to the SPM 130 (or the host or another device) to determine if the virtual machine disk image has been resized. In response to the size query, the SPM 130 (or the host or another device) may send a response to the engine 107 indicating the disk size of the virtual machine disk image. The acknowledgment or the query response may include an actual size that is different (e.g., larger) than the requested size as discussed above.

The disk size of a virtual machine disk image may be indicated in a number of places. The disk size may be indicated by the virtual machine disk image itself (e.g., the file size of an unmapped disk file or the header of a mapped disk file). The disk size of a virtual machine disk image may also be indicated in a metadata file separate from the virtual machine disk image. The disk size may be indicated in a separate metadata file for each virtual machine disk image or in a single metadata file that includes the disk size for a number of virtual machine disk images.

In order to keep the metadata disk size value match the actual disk size value, the host 120A-120C (in its capacity as the host of a running virtual machine or as the SPM 130) may, upon receiving a request to change the disk size of the virtual machine disk image as described above, sets the metadata disk size value to zero. Once the disk size of the virtual machine disk image has been changed to actual size, the host 120A-120C may set the metadata disk size value to the actual size.

In another embodiment, the engine 107, prior to sending a request to change the disk size of the virtual machine disk image, sets the metadata disk size value to zero. Once the disk size of the virtual machine disk image has been changed and the engine 107 has received an acknowledgement or query response indicating an actual size, the engine 107 may set the metadata disk size value to the actual size.

Figure 2:
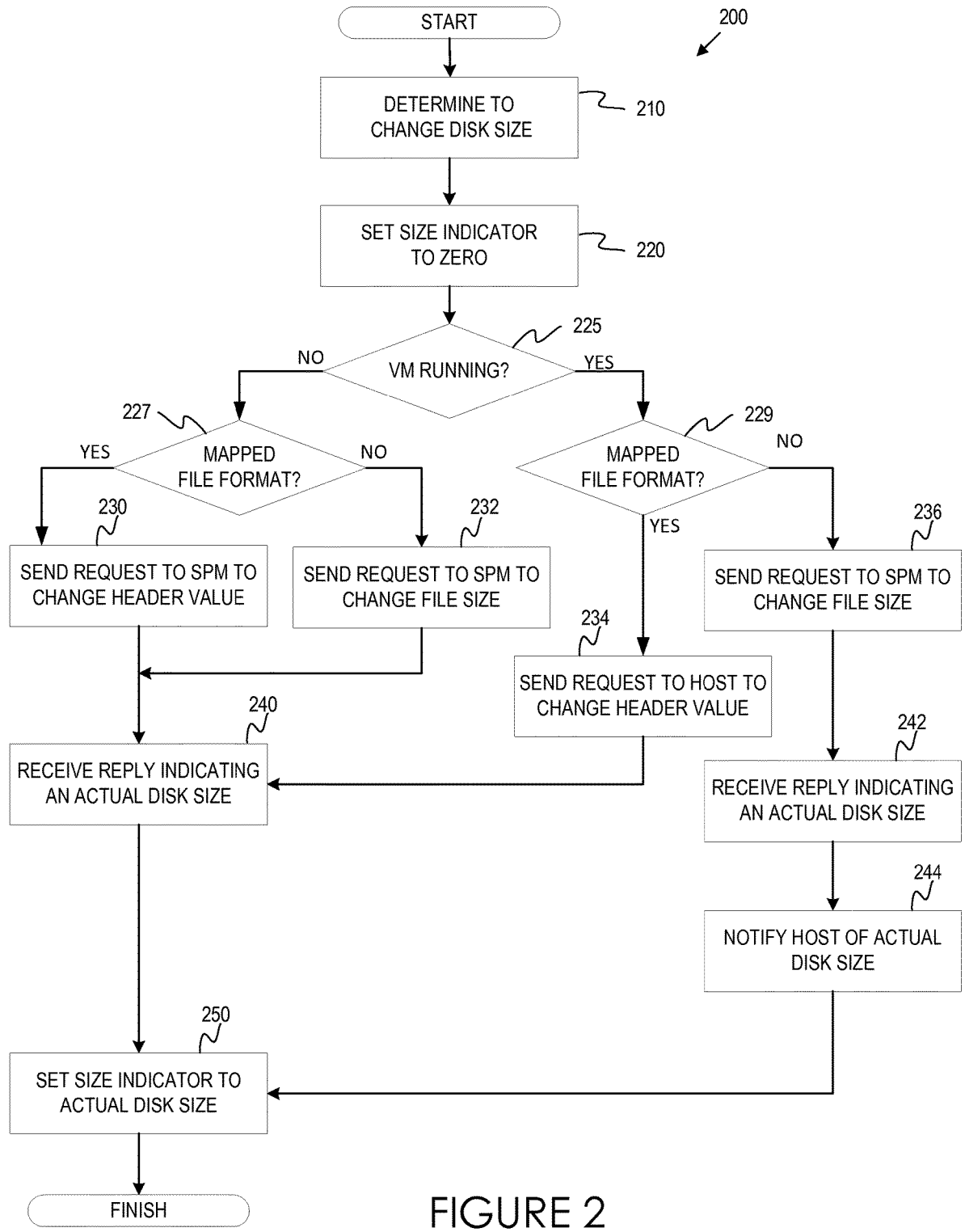
FIG. 2 is a flow diagram of a method of changing a disk size of a disk represented by a virtual machine disk image.

FIG. 2 is a flow diagram of a method 200 of changing a disk size of a disk represented by a virtual machine disk image. The method 200 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, the method 200 may be performed, in part, by processing logic of the engine 107 described above with respect to FIG. 1.

For simplicity of explanation, the method 200 is depicted and described as a series of acts. However, acts in accordance with this disclosure can occur in various orders and/or concurrently and with other acts not presented and described herein. Furthermore, not all illustrated acts may be performed to implement the method 200 in accordance with the disclosed subject matter. In addition, those skilled in the art will understand and appreciate that the method 200 could alternatively be represented as a series of interrelated states via a state diagram or events.

It is to be appreciated that the method 200 may be performed by an engine for any number of virtual machine disk images simultaneously, concurrently (partially overlapping in time), or consecutively. However, for ease of reference, the method 200 is described for a single virtual machine disk image.

At block 210 of method 200, the processing logic determines that a disk size of a disk represented by a virtual machine disk image is to be changed. The processing logic may determine that the disk size is to be changed in response to a resize command from a user. In one embodiment, the processing logic determines that the disk size is to be increased. The processing logic may determine that the disk size is to be increased if the amount of data stored on the disk is above a threshold percentage of the disk size. For example, if the disk is at least 90% full, it may be determined that the disk size is to be increased. Determining that the disk size is to be changed may also include determining a requested size to which the disk size is to be changed.

At block 220, the processing logic sets a size indicator in metadata corresponding to the virtual machine disk image to zero. In other embodiments, the size indicator may be set to a different value to indicate that a resize is in progress, e.g., 1 or −1 or some other value. The size indicator may be to set to a first value to indicate that an increase in disk size is in progress and may be set to a second value to indicate that a decrease in disk size is in progress. In another embodiment, the size indicator is set by other processing logic (e.g., that of the agent 126A-126C or VMM 124A-124C of the host 120A-120C as described in FIG. 1) in response to receiving a request to change the disk size prior to responding to the request by changing the disk size.

At block 225, the processing logic determines whether the virtual machine disk image is being used by a host machine to run a virtual machine. If it is determined that the virtual machine disk image is not being used to run a virtual machine, the method 200 moves to block 227 (described in the following paragraph). If it is determined that the virtual machine disk image is being used to run a virtual machine, the method moves to block 229 (described further below).

At block 227, the processing logic determines whether the virtual machine disk image is in a mapped file format or an unmapped file format. If it is determined that the virtual machine disk image is a mapped disk image file, such as a qcow file, the method 200 moves to block 230. If it is determined that the virtual machine disk image is an unmapped disk image file, such as a raw file, the method 200 moves to block 232.

At block 230, corresponding to the case when the virtual machine is not running and the virtual machine disk image is a mapped file (such as a qcow file), the processing logic sends a request to a storage pool manager to change a size parameter in a header of the mapped file. At block 232, corresponding to the case when the virtual machine is not running and the virtual machine disk image is an unmapped file (such as a raw file), the processing logic sends a request to the storage pool manager to change a file size of the unmapped file.

From either of blocks 230 or 232, the method 200 moves to block 240 where the processing logic receives a reply indicating an actual size of the disk size. The processing logic may receive the reply indicating the actual disk size as an acknowledgement of the request indicating that the disk size has been changed. The processing logic may receive the reply indicating the actual disk size in response to a query for the actual size of the disk size, wherein the query is separate from the request to change the disk size. In one embodiment, the query may be sent to a different device than the device to which the request to change the disk size is sent.

At block 250, the processing logic sets the size indicator in the metadata to the actual size of the disk size, thereby indicating that the resize has been completed successfully. In another embodiment, the size indicator is set by other processing logic (e.g., that of the agent 126A-126C or VMM 124A-124C of the host 120A-120C as described in FIG. 1) in response to changing the disk size.

At block 229, reached (as described above) when it is determined in block 225 that the virtual machine is running, the processing logic determines whether the virtual machine disk image is in a mapped file format or an unmapped file format. If it is determined that the virtual machine disk image is a mapped disk image file, such as a qcow file, the method 200 moves to block 234. If it is determined that the virtual machine disk image is an unmapped disk image file, such as a raw file, the method 200 moves to block 236.

At block 234, corresponding to the case when the virtual machine is running and the virtual machine disk image is a mapped file (such as a qcow file), the processing logic sends a request to a host running the virtual machine to change a size parameter in a header of the mapped file. The request may request that the host instruct the virtual machine to change the size parameter. At block 236, corresponding to the case when the virtual machine is running and the virtual machine disk image is an unmapped file (such as a raw file), the processing logic sends a request to the storage pool manager to change a file size of the unmapped file.

From block 234, the method 200 moves to block 240 where a reply indicating an actual size of the disk size is received as described above. From block 236, the method 200 moves to block 242 where a reply indicating an actual size of the disk size as received in the same manner as described above with respect to block 240. However, from block 240, the method 200 moves to block 250, whereas, from block 242, the method 200 moves to block 244 before moving to block 250. In block 244, the processing logic sends a notification of the actual size of the disk size to the host running the virtual machine. The processing logic may send a request to the host to notify the virtual machine of the actual size of the disk size.

Figure 3:
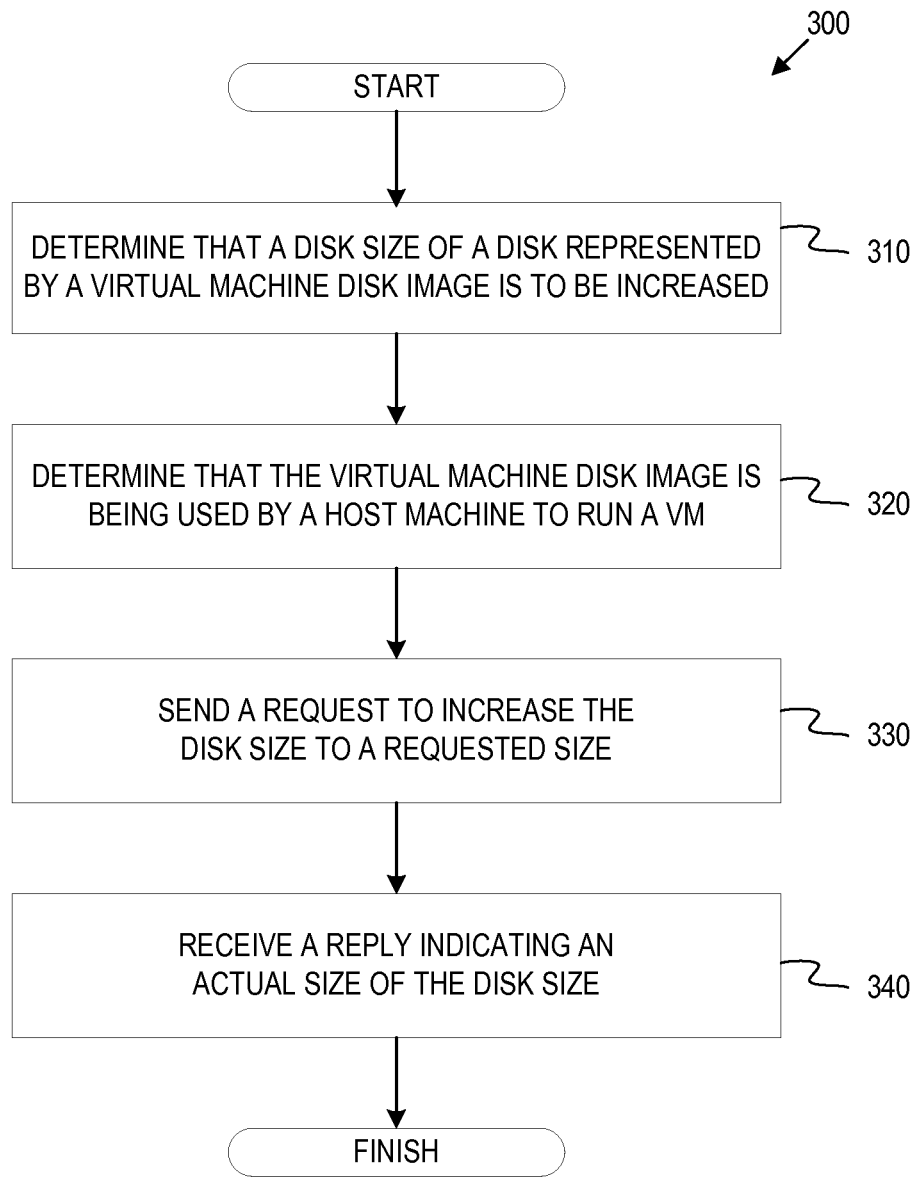
FIG. 3 is a flow diagram of a method of increasing a disk size of running a virtual machine.

FIG. 3 is a flow diagram of a method 300 of increasing a disk size of running virtual machine. The method 300 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, the method 300 may be performed, in part, by processing logic of the engine 107 described above with respect to FIG. 1.

For simplicity of explanation, the method 300 is depicted and described as a series of acts. However, acts in accordance with this disclosure can occur in various orders and/or concurrently and with other acts not presented and described herein. Furthermore, not all illustrated acts may be performed to implement the method 300 in accordance with the disclosed subject matter. In addition, those skilled in the art will understand and appreciate that the method 300 could alternatively be represented as a series of interrelated states via a state diagram or events.

It is to be appreciated that the method 300 may be performed by a host for any number of virtual machines simultaneously, concurrently (partially overlapping in time), or consecutively. However, for ease of reference, the method 300 is described for a single virtual machine disk image.

At block 310 of method 300, the processing logic determines that a disk size of disk represented by a virtual machine disk image is to be increased. The processing logic may determine that the disk size is to be increased based on a command from a user. The processing logic may determine that the disk size is to be increased if the amount of data stored on the disk is above a threshold percentage of the disk size. For example, if the disk is at least 90% full, it may be determined that the disk size is to be increased. Determining that the disk size is to be changed may also include determining a requested size to which the disk size is to be changed.

At block 320, the processing logic determines that the virtual machine disk image is being used by a host machine to run a virtual machine. The processing logic may determine that the virtual machine is running by checking a lock on the virtual machine disk image file. The processing logic may determine that the virtual machine is running by checking a list of running virtual machines.

At block 330, the processing logic sends a request to increase the disk size to a requested size. In one embodiment, the virtual machine disk image is an unmapped disk image file and sending the request includes sending a request to a storage pool manager to increase a file size of the unmapped disk image file. The storage pool manager may be the same as the host machine running the virtual machine or a different host machine. In another embodiment, the virtual machine disk image is a mapped disk image file and sending the request includes sending a request to the host machine to increase a size parameter in a header of the mapped disk image file. The request to the host machine may be request that the host machine instruct the virtual machine to increase the size parameter in the header of the mapped disk image file.

At block 340, the processing logic receives a reply indicating an actual size of the disk size, wherein the actual size is greater than or equal to the requested size. In one embodiment, the processing logic receives the reply in response to and as an acknowledgment of the request to increase the disk size. In another embodiment, the processing logic receives the reply in response to and as an answer to a query for the actual size of the disk size. The query may be sent to the same device as the request or to a different device.

In one embodiment, as described above with respect to blocks 220 and 250 of FIG. 2, the processing logic (or other processing logic) may set a size indicator in metadata to zero or another dummy value before sending the request (or after receiving the request) and may set the size indicator to the actual size after receiving the reply (or after complying with the request).

Figure 4:
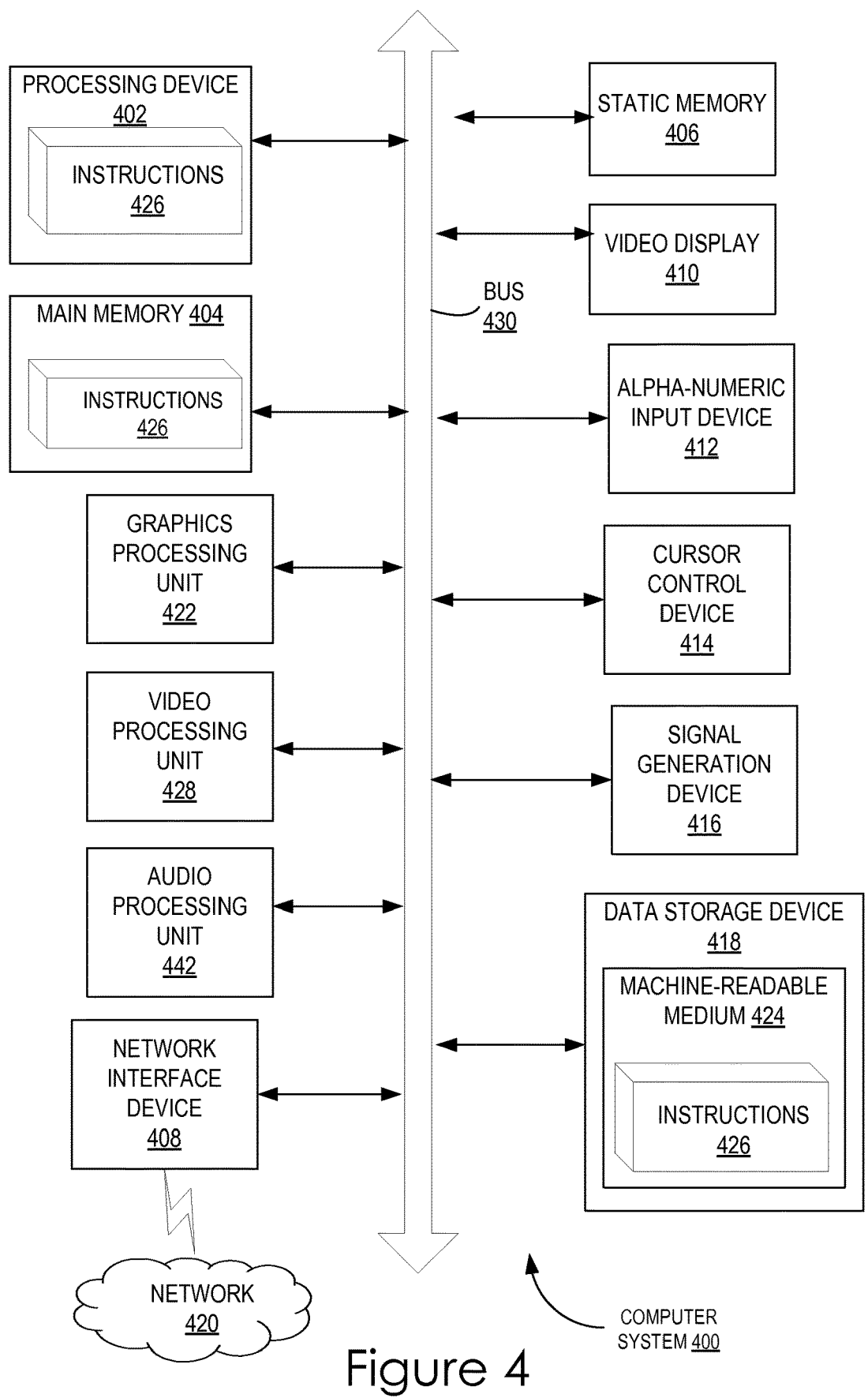
FIG. 4 illustrates a diagrammatic representation of a machine in the exemplary form of a computer system.

FIG. 4 illustrates a diagrammatic representation of a machine in the example form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, the engine 107 (as discussed in conjunction with FIG. 1) may be included in the execution block processing device 402.

The computer system 400 includes a processing device 402, a main memory 404 (e.g., read-only memory (ROM), flash memory, dynamic random access memory (DRAM) (such as synchronous DRAM (SDRAM) or DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. In one embodiment, processing device 402 may include one or processing cores. The processing device 402 is configured to execute the instructions 426 of processing logic for performing the operations discussed herein.

The computer system 400 may further include a network interface device 408 communicably coupled to a network 420. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), a signal generation device 416 (e.g., a speaker), or other peripheral devices. Furthermore, computer system 400 may include a graphics processing unit 422, a video processing unit 428, and an audio processing unit 432. In another embodiment, the computer system 400 may include a chipset (not illustrated), which refers to a group of integrated circuits, or chips, that are designed to work with the processing device 402 and controls communications between the processing device 402 and external devices. For example, the chipset may be a set of chips on a motherboard that links the processing device 402 to very high-speed devices, such as main memory 404 and graphic controllers, as well as linking the processing device 402 to lower-speed peripheral buses of peripherals, such as USB, PCI or ISA buses.

The data storage device 418 may include a computer-readable storage medium 424 on which is stored instructions 426 embodying any one or more of the methodologies of functions described herein. The instructions 426 may also reside, completely or at least partially, within the main memory 404 and/or within the processing device 402 during execution thereof by the computer system 400; the main memory 404 and the processing device 402 also constituting computer-readable storage media.

The computer-readable storage medium 424 may also be used to store instructions 426 utilized by the engine 107, such as described with respect to FIG. 1, and/or a software library containing methods that call the above applications. While the computer-readable storage medium 424 is shown in an example embodiment to be a single medium, the term "computer-readable storage medium" or, simply, "computer-readable medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "forwarding", "provisioning", "creating", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of any future presented claims. Accordingly, the specification and drawings are to be regarded in an illustrative sense rather than a restrictive sense. The scope of the invention should, therefore, be determined with reference to any future claims, along with the full scope of equivalents to which such claims are entitled.

What is claimed is:

1. A method comprising:
   determining, by a processing device, that a disk size of a disk represented by a virtual machine disk image is to be increased in view of an amount of data being stored on the disk exceeding a threshold, wherein the threshold corresponds to a percentage of the disk size;
   setting, by the processing device, a size indicator in metadata corresponding to the virtual machine disk image to zero;
   determining, by the processing device, that the virtual machine disk image is being used by a host machine to run a virtual machine;
   determining, by the processing device, whether the virtual machine disk image is a mapped disk image file or an unmapped disk image file;
   in response to determining the virtual machine disk image is the unmapped disk image file, sending a request to a storage pool manager to increase, while the virtual machine disk image is being used by the host machine to run the virtual machine, a file size being used for the unmapped disk image file to a requested size;
   in response to determining the virtual machine disk image is the mapped disk image file, sending a request to the host machine to increase a size parameter in a header of the mapped disk image file; and
   determining, by the processing device, that the virtual machine disk image has been resized, wherein determining that the virtual machine disk image has been resized comprises:
      sending a query to the storage pool manager for an actual size of the disk size;
      receiving a reply responsive to the query indicating the actual size of the disk size being used for at least one of the unmapped disk image file or the mapped disk image file, wherein the actual size has been modified to be greater than or equal to the requested size; and
      setting the size indicator in the metadata to the actual size of the disk size.

2. The method of claim 1, the method further comprising:
   sending, to the host machine, a request to notify the virtual machine of the actual size.

3. The method of claim 1, wherein the request to the host machine to increase the size parameter is a request that the host machine instruct the virtual machine to increase the size parameter.

4. The method of claim 1, wherein receiving the reply indicating the actual size of the disk size comprises receiving the reply in response to and as an acknowledgment of the request to increase the disk size.

5. The method of claim 1, wherein determining that that the virtual machine disk image is being used by a host machine to run a virtual machine comprises at least one of: determining whether the virtual machine disk image is locked, or determining whether the virtual machine is included in a list of running virtual machines.

6. The method of claim 1, wherein the disk size of the virtual machine disk image is indicated by at least one of: a file size of an unmapped disk file, a header of a mapped disk file, a metadata file associated with the virtual machine disk image that is separate from the virtual machine disk image, or a metadata file associated with at least two or more virtual machine disk images that is separate from the virtual machine disk image, wherein the two or more virtual machine disk images includes the virtual machine disk image.

7. A non-transitory computer-readable medium having instructions encoded thereon which, when executed by a processing device, cause the processing device to:
   determine that a disk size of a disk represented by a virtual machine disk image is to be increased in view of an amount of data being stored on the disk exceeding a threshold value corresponding to the disk size;
   set a size indicator in metadata corresponding to the virtual machine disk image to zero;
   determine that the virtual machine disk image is being used by a host machine to run a virtual machine;
   determine, by the processing device, whether the virtual machine disk image is a mapped disk image file or an unmapped disk image file;
   in response to determining the virtual machine disk image is the unmapped disk image file, send a request to a storage pool manager to increase, while the virtual machine disk image is being used by the host machine to run the virtual machine, a file size being used for the unmapped disk image file to a requested size;
   in response to determining the virtual machine disk image is the mapped disk image file, send a request to the host machine to increase a size parameter in a header of the mapped disk image file; and
   determine, by the processing device, that the virtual machine disk image has been resized, wherein the processing device is to:
      send a query to the storage pool manager for an actual size of the disk size;
      receive a reply responsive to the query indicating the actual size of the disk size being used for at least one of the unmapped disk image file or the mapped disk image file, wherein the actual size has been modified to be greater than or equal to the requested size; and
      set the size indicator in the metadata to the actual size of the disk size.

8. The non-transitory computer-readable medium of claim 7, wherein the instructions cause the processing device further to:
   send, to the host machine, a request to notify the virtual machine of the actual size.

9. The non-transitory computer-readable medium of claim 7, wherein determining that the virtual machine disk image is being used by a host machine to run a virtual machine comprises at least one of: determining whether the virtual machine disk image is locked, or determining whether the virtual machine is included in a list of running virtual machines.

10. The non-transitory computer-readable medium of claim 7, wherein the disk size of the virtual machine disk image is indicated by at least one of: a file size of an unmapped disk file, a header of a mapped disk file, a metadata file associated with the virtual machine disk image that is separate from the virtual machine disk image, or a metadata file associated with two or more virtual machine disk images that is separated from the virtual machine disk image, wherein the two or more virtual machine disk images includes the virtual machine disk image.

11. An apparatus comprising:
   a memory; and
   a processing device, operatively coupled to the memory, the processing device to:

determine that a disk size of a disk represented by a virtual machine disk image is to be increased in view of an amount of data being stored on the disk exceeding a threshold value corresponding to the disk size;

set a size indicator in metadata corresponding to the virtual machine disk image to zero;

determine that the virtual machine disk image is being used by a host machine to run a virtual machine;

determine whether the virtual machine disk image is a mapped disk image file or an unmapped disk image file;

in response to determining the virtual machine disk image is the unmapped disk image file, send a request to a storage pool manager to increase, while the virtual machine disk image is being used by the host machine to run the virtual machine, a file size being used for the unmapped disk image file to a requested size;

in response to determining the virtual machine disk image is the mapped disk image file, send a request to the host machine to increase a size parameter in a header of the mapped disk image file; and determine that the virtual machine disk image has been resized, wherein the processing device is to:
send a query for an actual size of the disk size;
receive a reply responsive to the query indicating the actual size of the disk size being used for at least one of the unmapped disk image file or the mapped disk image file, wherein the actual size has been modified to be greater than or equal to the requested size; and
set the size indicator in the metadata to the actual size of the disk size.

12. The apparatus of claim 11, the processing device further to:
in response to determining the virtual machine disk image is the unmapped disk image file, send a request to a storage pool manager to increase a file size of the unmapped disk image file.

13. The apparatus of claim 11, the processing device further to:
send, to the host machine, a request to notify the virtual machine of the actual size.

14. The apparatus of claim 12, wherein the query for the actual size of the disk size is sent to the storage pool manager.

15. The apparatus of claim 11, wherein determining that the virtual machine disk image is being used by a host machine to run a virtual machine comprises at least one of: determining whether the virtual machine disk image is locked, or determining whether the virtual machine is included in a list of running virtual machines.

* * * * *